United States Patent [19]

Hahn

[11] 4,360,631
[45] Nov. 23, 1982

[54] FLOWABLE, ROOM TEMPERATURE VULCANIZABLE SILICONE COMPOSITION

[75] Inventor: James R. Hahn, Midland, Mich.

[73] Assignee: Dow Corning Corporation, Midland, Mich.

[21] Appl. No.: 241,263

[22] Filed: Mar. 6, 1981

[51] Int. Cl.$^3$ .......................... C08L 83/06; C08K 3/26
[52] U.S. Cl. .................................... 524/788; 524/425; 524/864; 524/865; 528/32; 528/34; 523/213
[58] Field of Search .................. 528/32; 524/425, 788, 524/864

[56] References Cited

U.S. PATENT DOCUMENTS

| 3,817,909 | 6/1974 | Toporcer et al. | 260/37 SB |
| 3,996,184 | 12/1976 | Klosowski | 528/32 |
| 4,071,498 | 1/1978 | Frye et al. | 528/32 |
| 4,108,832 | 8/1978 | Hahn | 528/32 |

Primary Examiner—Wilbert J. Briggs, Sr.
Attorney, Agent, or Firm—Roger H. Borrousch

[57] ABSTRACT

A flowable, room temperature vulcanizable silicone composition is obtained by mixing 100 parts by weight of hydroxyl endblocked polydiorganosiloxane, 0 to 150 parts by weight of a nonacidic, nonreinforcing filler, 2 to 20 parts by weight of methylvinyldi-(epsilon-caprolactamo)silane and 0.25 to 7 parts by weight of an aminoxysilicon compound having 3 to 10 aminoxy groups per molecule. The composition cures on exposure to moisture to a low modulus silicone elastomer which is useful as a sealant for horizontal joints such as in highways or outdoor patios.

18 Claims, No Drawings

FLOWABLE, ROOM TEMPERATURE VULCANIZABLE SILICONE COMPOSITION

BACKGROUND OF THE INVENTION

1. Field of the Invention

This invention relates to a flowable, room temperature vulcanizable silicone composition.

2. Description of the Prior Art

Hurwitz and deBenneville, in U.S. Pat. No. 2,876,234, issued Mar. 3, 1959, teach a composition having the formula

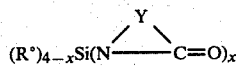

where R° is an alkyl group having 1 to 4 carbon atoms, Y is an alkylene group having 3 to 18 carbon atoms, with a chain of at least 3 but no more than 5 carbon atoms extending between the N atom and carbonyl group, and x is an integer having a value of 1 to 4. Such materials are suggested as insecticides, and miticides, coatings applied to leather and fabrics, and films to modify the water-absorption, shrinkage, and dyeing properties.

In U.S. Pat. No. 3,817,909, issued June 18, 1974, Toporcer and Crossan disclose a low modulus room temperature vulcanizable silicone elastomer obtained by mixing 100 parts by weight of a hydroxyl endblocked polydiorganosiloxane, 0 to 150 parts by weight of a nonacidic, nonreinforcing filler, 2 to 20 parts by weight

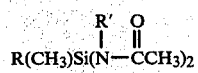

in which R is methyl, vinyl, or phenyl, and R' is methyl, ethyl, or phenyl and 0.25 to 7 parts by weight of an aminoxy silicon compound having 3 to 10 aminoxy groups per molecule. The low modulus silicone elastomer is useful in building construction, such as in sealing joints wherein the building materials sealed by these materials can expand and contract without breaking the seal.

In U.S. Pat. No. 3,996,184, issued Dec. 7, 1976, to Klosowski, it is noted that the compositions of Toporcer et al. were found to form crystals when exposed to low temperature, 5° C. for example. When this happened, the compositions of Toporcer slumped at low temperatures. Klosowski teaches that his composition, containing from 1 to 5 parts of polar solvent selected from the group of N,N-dimethylformamide, acetonitrile, and N-n-butylacetamide, prevented the crystal formation and the undesired slump at low temperatures.

A method of chain extending organosiloxanes is disclosed in U.S. Pat. No. 4,071,498, issued Jan. 31, 1978, to Frye and Klosowski. They mix organosiloxanes containing silicon-bonded hydroxyl radicals with methylvinyldi-(epsilon-caprolactamo)silane to increase the molecular weight of the organosiloxane. They point out that the vinyl groups in the product organosiloxane are particularly useful as sites for further reaction.

SUMMARY OF THE INVENTION

The composition of this invention is a flowable, room temperature curable silicone composition. Because the composition flows, it is particularly useful for sealing joints in a horizontal position, such as the joints in highways or outdoor patios.

The composition consists essentially of a hydroxyl endblocked polydiorganosiloxane, optionally a nonacidic, nonreinforcing filler, an aminoxysilicon compound as a crosslinking material, and methylvinyldi-(epsilon-caprolactamo)silane as a chain-extending material. The use of the methylvinyldi-(epsilon-caprolactamo)silane causes the composition to be of a flowable viscosity rather than the nonflowable viscosity obtained with other chain-extending materials. The unique combination of ingredients in the composition of this invention yields a product which is flowable for the most efficient placement before cure, and cures on exposure to moisture to a low modulus silicone elastomer that bonds to the surfaces it is placed upon to yield a sealed waterproof joint.

DESCRIPTION OF THE INVENTION

This invention relates to a composition consisting essentially of the product obtained by mixing (A) 100 parts of weight of a hydroxyl endblocked polydiorganosiloxane having a viscosity at 25° C. of from 0.07 to 15 Pa·s, and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals; (B) 0 to 150 parts by weight of a nonacidic, nonreinforcing filler; (C) 2 to 20 parts by weight of methylvinyldi-(epsilon-caprolactamo)silane; (D) 0.25 to 7 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR''₂ and a heterocyclic amine, R'' is a monovalent hydrocarbon radical, the —OX group being bonded to silicon atoms through an Si—O bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent radicals selected from the group consisting of monovalent hydrocarbon radicals and halogenated monovalent hydrocarbon radicals bonded to the silicon atoms through silicon-carbon bonds and there being an average of at least one monovalent hydrocarbon radical or halogenated hydrocarbon radical per silicon atom, said aminoxysilicon compound being present in an amount which is not greater than the weight of silane (C), to yield a composition which flows under the force of gravity.

The hydroxyl endblocked polydiorganosiloxane (A) can have a viscosity at 25° C. of from 0.07 to 15 Pa·s. The hydroxyl endblocked polydiorganosiloxanes have organic groups selected from methyl, ethyl, vinyl, phenyl, and 3,3,3-trifluoropropyl radicals. The organic groups of the polydiorganosiloxane contain no more than 50 percent phenyl or 3,3,3-trifluoropropyl radicals and no more than 10 percent vinyl radicals based on the total number of orgaic radicals in the polydiorganosiloxane. Other monovalent hydrocarbon radicals and halogenated monovalent hydrocarbon radicals in small amounts can be present in the polydiorganosiloxane.

The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane, and 3,3,3-trifluoropropylmethylsiloxane. The term polydiorganosiloxane as used herein does not preclude small amounts of other siloxane units such as monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The silane (C) is methylvinyldi-(epsilon-caprolactamo)silane. It is represented by the structural formula

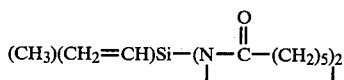

and is a key ingredient in the composition of this invention. The use of this silane results in a composition of lower viscosity than with other usable chain-extending silanes such as the methylvinyldi-(N-methylacetamido)-silane illustrated by Torporcer and Crossan in U.S. Pat. No. 3,817,909. Silane (C) is a difunctional material which reacts during the cure of the instant composition with the hydroxyl endblocked polydiorganosiloxane (A) and the aminoxysilicon compound (D) to yield a cured silicone elastomer with physical property values that would not be possible if the silane did not function as a chain-extension agent to effectively raise the molecular weight of the hydroxyl endblocked polydiorganosiloxane (A). Because effective chain extension occurs during the curing process, lower viscosity hydroxyl endblocked polydiorganosiloxanes can be used to provide cured products with satisfactory physical properties. The resulting combination of the relatively low viscosity hydroxyl endblocked polydiorganosiloxane, methylvinyldi-(epsilon-caprolactamo)silane and aminoxysilicon compound yields a unique composition that is flowable before cure, but cures to a low modulus silicone elastomer with useful physical properties as a sealant.

The methylvinyldi-(epsilon-caprolactamo)silane can be prepared by mixing at room temperature under substantially anhydrous conditions, methylvinyldichlorosilane, epsilon-caprolactam, triethylamine, and toluene. The methylvinyldi-(epsilon-caprolactamo)silane produced can be recovered by filtering to remove the by-produced triethylamine-hydrogen chloride and vacuum distilling the filtrate to remove the toluene and to further purify the silane by distillation.

The aminoxysilicon compounds, (D), can be silicon compounds having from 1 to 100 silicon atoms per molecule in which there are from 3 to 10 aminoxy groups per molecule. The aminoxysilicon compounds can be prepared by the method shown in U.S. Pat. No. 3,441,583, issued Apr. 29, 1969, to Murphy, which also illustrates many aminoxysilicon compounds. The aminoxysilicon compounds include silanes and siloxanes. The aminoxy group which is bonded to the silicon atoms through silicon-oxygen bonds can be represented by the general formula —OX wherein X is a monovalent amine radical of the group —NR″$_2$ or heterocyclic amine. R″ represents a monovalent hydrocarbon radical. The —NR″$_2$ groups can be represented by N,N-diethylamino, N,N-ethylmethylamino, N,N-dimethylamino, N,N-diisopropylamino, N,N-dipropylamino, N,N-dibutylamino, N,N-dipentylamino, N,N-dihexylmino, N,N-dicyclohexylamino, N,N-methylpropylamino, N,N-methylbutylamino, N,N-diphenylamino, N,N-ditolylamino, N,N-methylphenylamino, and N,N-methylnaphthylamino. The heterocyclic amines can be illustrated by aziridinyl, pyrrolidyl, piperidyl, and morpholinyl.

The aminoxysilicon compounds have 1 to 100 silicon atoms per molecule, 3 to 10 aminoxy groups per molecule, and at least one monovalent hydrocarbon radical or halogenated monovalent hydrocarbon radical per silicon atom. Thus, those aminoxysilicon compounds having one silicon atom are silanes having 3 aminoxy groups and one monovalent hydrocarbon radical or halogenated monovalent hydrocarbon radical per molecule. These aminoxy silanes have a general formula R‴Si(OX)$_3$ in which R‴ can be a monovalent hydrocarbon radical or halogenated monovalent hydrocarbon radical. R‴ can be illustrated by methyl, ethyl, phenyl, vinyl, hexyl, octadecyl, cyclohexyl, butyl, heptyl, octyl, benzyl, phenylethyl, naphthyl, propyl, isopropyl, chlorophenyl, 3,3,3-trifluoropropyl, beta(perfluoropentyl)ethyl, iodonaphthyl, bromoheptyl and the like.

The aminoxysilicon compounds which have more than one silicon atom per molecule can be linear polysiloxanes and cyclic polysiloxanes, for example, either homopolymers or copolymers or mixtures of the siloxanes, as well as, mixtures of the siloxanes and silanes. The silicon atoms of the siloxanes are linked together through silicon-oxygen-silicon bonds with the remaining valences of the silicon atoms not bonded to aminoxy groups being bonded to monovalent radicals as defined by R‴ above. These aminoxy siloxanes can be illustrated by the following compounds and additional illustrations can be found in U.S. Pat. No. 3,441,583 issued Apr. 29, 1969: 1,1,3-tri(N,N-diethylamino)-1,3,3-trimethyldisiloxane,

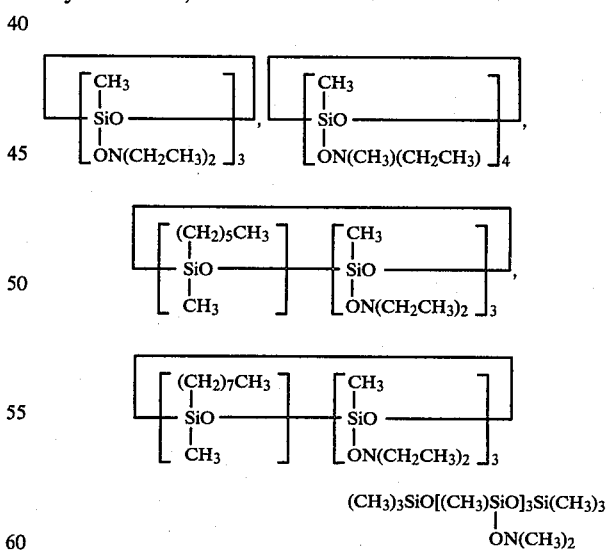

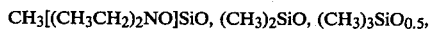

and polymers having at least three silicon-bonded aminoxy groups per molecule and consisting of two or more different siloxane units which are illustrated by the following group:

CH$_3$[(CH$_3$CH$_2$)$_2$NO]SiO, (CH$_3$)$_2$SiO, (CH$_3$)$_3$SiO$_{0.5}$,

[(CH$_3$CH$_2$)$_2$NO](CH$_3$)$_2$SiO$_{0.5}$,

C$_6$H$_5$[(CH$_3$CH$_2$)$_2$NO]SiO, (CH$_2$=CH)(CH$_3$)SiO,

CH$_3$SiO$_{1.5}$, (CF$_3$CH$_2$CH$_2$)(CH$_3$)SiO,

CH$_3$[(CH$_3$)$_2$NO]SiO, CH$_3$[C$_6$H$_5$(CH$_3$)NO]SiO, and

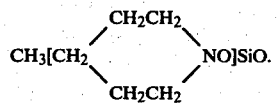

The amount of methylvinyldi-(epsilon-caprolactamo)silane (C) can be from 2 to 20 parts by weight per 100 parts by weight of polydiorganosiloxane. The amount of methylvinyldi-(epsilon-caprolactamo)silane to provide a one package silicone elastomer composition must be sufficient to provide at least one methylvinyldi-(epsilon-caprolactamo)silane molecule per silicon-bonded hydroxyl radical of the hydroxyl endblocked polydiorganosiloxane. When the amount of methylvinyldi-(epsilon-caprolactamo)silane is less than that sufficient to provide at least one methylvinyldi-(epsilon-caprolactamo)silane molecule per silicon-bonded hydroxyl radical, the silicone elastomer composition is a two package or two component composition. The most preferred compositions have from 5 to 15 parts by weight of the methylvinyldi-(epsilon-caprolactamo)silane, (C), per 100 parts by weight of the hydroxyl endblocked polydiorganosiloxane. If less than 5 parts by weight of the methylvinyldi-(epsilon-caprolactamo)silane is used, the viscosity of the hydroxyl endblocked polydiorganosiloxane must be above about 0.5 Pa·s at 25° C. in order to have at least one mole of silane (C) for each mole of OH in 100 parts of the hydroxyl endblocked polydiorganosiloxane. The compositions containing from 5 to 20 parts by weight of methylvinyldi-(epsilon-caprolactamo)silane per 100 parts by weight of (A) can be packaged with all the reactive ingredients in one package and stored over extended periods of time under conditions which exclude moisture, such as for a year or more. No advantages are experienced in exceeding 20 parts by weight methylvinyldi-(epsilon-caprolactamo)silane per 100 parts of (A) and slower cures and less desirable physical properties are observed.

The amount of aminoxysilicon compound can be from 0.25 to 7 parts by weight per 100 parts by weight of hydroxyl endblocked polydiorganosiloxane. The amount of aminoxysilicon compound is dependent to some extent upon the viscosity of the hydroxyl endblocked polydiorganosiloxane. The modulus of the cured silicone composition is dependent upon the relationship between the amount of silicon-bonded hydroxyl radical present and the amount of aminoxysilicon compound used. If a lower viscosity polydiorganosiloxane is used (higher amount of silicon-bonded hydroxyl radical), the amount of aminoxysilicon compound used must be in the lower end of the allowable range in order for the cured silicone-composition to have a low modulus. If the amount of aminoxysilicon compound exceeds 7 parts by weight per 100 parts by weight of (A), the resulting cured products are high modulus silicone elastomers. The preferred amount of aminoxysilicon compound is from 1 to 2 parts by weight per 100 parts by weight of (A). However, the amount of aminoxysilicon compound regardless of viscosity should not exceed the weight of the methylvinyldi-(epsilon-caprolactamo)silane (C). Amounts of aminoxysilicon compound exceeding the weight of silane (C) result in cured products having high modulus.

The compositions of this invention are stored under conditions which exclude moisture because the methylvinyldi-(epsilon-caprolactamo)silane and aminoxysilicon compounds are hydrolyzable when contacted by moisture. The compositions of the present invention are also adversely effected by acidic materials and thus the ingredients used in making the compositions of this invention should be neutral or basic to litmus paper when a small amount of the particular ingredient is placed in water.

The compositions of this invention can also contain fillers. The fillers can be present in amounts of from 0 to 150 parts by weight per 100 parts by weight of (A), preferably from 10 to 125 parts by weight filler per 100 parts by weight of (A). These fillers can be any nonacidic, nonreinforcing filler and include, for example, calcium carbonate, ferric oxide, nonacidic carbon black, diactomaceous earth, alumina, hydrated alumina, titanium dioxide, glass microballoons, organic fillers, resins, such as silicone resins, crushed quartz, calcium sulfate and the like. It is possible to use small amounts of treated reinforcing silica filler and still retain a composition which flows under the force of gravity. Large amounts of treated reinforcing filler will thicken the composition to the point where it will no longer flow and is outside the scope of this invention. Other conventional additives can be used, as long as they are neutral or basic, including pigments, dyes, antioxidants, heat stability additives, and the like. The low modulus room temperature vulcanizable silicone elastomer compositions of this invention can be prepared by mixing the defined ingredients.

The compositions are preferably made by mixing the hydroxyl endblocked polydiorganosiloxane and filler, if used, to make a mixture with the filler well dispersed. A suitable mixture can usually be obtained in one hour using commercial mixers. The resulting mixture is preferably deaired and then, when making a one package system, a mixture of the methylvinyldi-(epsilon-caprolactamo)silane and aminoxysilicon compound is added and mixed with the polymer and filler mixture. This mixing is done under conditions which essentially exclude moisture and then the resulting composition is put into containers for storage under conditions which essentially exclude moisture. Once these one package compositions are made, they are stable for as long as one year if the essentially moisture-free conditions are maintained, but will cure to low modulus silicone elastomers when exposed to moisture at room temperature. Although the above method of making the compositions is preferred, the methods of making these compositions are not very critical. The most significant feture is the condition of moisture exclusion required for mixing and storage wherein either or both the methylvinyldi-(epsilon-caprolatamo)silane and aminoxysilicon compounds are involved. It is also observed that the best results are obtained, if the aminoxysilicon compound is added to the hydroxyl endblocked polydiorganosiloxane (alone or in a mixture with the filler and/or other additives) either prior to adding the methylvinyldi-(epsilon-caprolactamo)silane or with the methylvinyldi-(epsilon-caprolactamo)silane as a mixture.

If the amount of silane (C) is not sufficient to provide one mole of the silane for each mole of OH in the composition, the composition must be a multipackage system if shelf life is desired. Here, the polydiorganosiloxane and the silane (C), unless in separate packages, react to produce a polydiorganosiloxane of higher viscosity and therefore would reduce the flowability of the composition. Silane (C) and the aminoxysilicon compound may be mixed in a second package, or they may be in separate packages. Mixing the packages together yields a flowable composition which cures when exposed to moisture. Packages containing silane (C), the aminoxysilicon compound or mixture thereof must be stored under conditions excluding moixture.

Since the composition of this invention flows, it is particularly useful as a caulking or sealing material in horizontal joints such as those found in highways or patios. The composition is extruded into the joint and it then flows into the space to provide a tight seal against both sides.

The following examples are presented for illustrative purposes only and should not be construed as limiting the invention which is delineated in the claims.

Preparation of Methylvinyldi-(epsilon-caprolactamo)silane

In a one liter, 3-necked flask equipped with a stirrer, Dean Stark trap and condenser, 95 g of epsilon-caprolactam, 101 g of triethylamine, and 600 ml of toluene were placed and the mixture was azeotroped to remove the water which was collected in the trap and removed. Using an addition funnel, 56.4 g of methylvinyldichlorosilane was added to the dried mixture after it had cooled to room temperature. The addition took approximately 10 minutes. After the addition of the silane, the mixture was then stirred for 2.5 hours. The resulting mixture was filtered under a nitrogen atmosphere to remove the triethylamine-hydrogen chloride by-product. The filter cake was washed with 200 ml of dry toluene. The filtrate and wash were vacuum stripped to remove the toluene and 119.5 g material was recovered. This material was a crude methylvinyldi-(epsilon-caprolactamo)silane containing some unreacted epsilon-caprolactam. This product was neutral to pH paper when hydrolyzed and a mixture of 0.37 g silane with 10 g of a hydroxyl endblocked polydimethylsiloxane having a viscosity at 25° C. of 4.5 Pa·s skinned over in 10 to 15 minutes. The crude silane product was then vacuum distilled using a 10-inch Vigreux column. The product collected was methylvinyldi-(epsilon-caprolactamo)silane which had a boiling point of 160° C. at 133.3 Pa. The structure of the silane was confirmed by infrared analysis and nuclear magnetic resonance analysis.

Preparation of Aminoxy Silicon Compound

The aminoxy functional compound was prepared by slowly adding N,N-diethylhydroxylamine to a silicon compound precursor containing silicon-bonded hydrogen atoms as a polymer having per molecule an average of two trimethylsiloxane units, five methylhydrogensiloxane units and three dimethylsiloxane units. The addition of the N,N-diethylhydroxylamine was continued until the hydrogen evolution was over. The reaction was done under conditions which excluded moisture. The aminoxy product was obtained and stored until used under conditions which excluded moisture from contacting the aminoxy functional compound.

EXAMPLE 1

A. A composition was prepared by mixing 100 parts by weight of a hydroxyl endblocked polydimethylsiloxane having a viscosity of 4 Pa·s at 25° C. with 110 parts by weight of a commercially available calcium carbonate filler, used as received. Thereafter, 9.6 parts by weight of methylvinyldi(epsilon-caprolactamo)silane and 1.5 parts by weight of the aminoxy functional compound described above were added to the mixture under conditions excluding moisture and then the mixture was mixed thoroughly under conditions which excluded moisture. The mixture was stored in a tube under conditions which excluded moisture from contacting the composition.

B. A similar composition to A was prepared except the calcium carbonate filler was dried for 48 hours at 150° C. before making this composition, and 6 parts by weight of methylvinyldi-(N-methylacetamido)silane was used in place of the methylvinyldi-(epsilon-caprolactamo)silane in A.

Each of the above compositions was formed into sheets and allowed to cure by exposing it to the moisture in the air at ambient conditions for seven days. Each of the cured elastomers was a low modulus elastomer. The extrusion rate was determined by Military Specification Mil-S-7502 with the results in grams per minute. The durometer was determined by ASTM-D-2240 on the Shore A scale. The tensile strength at break, and elongation at break were determined by ASTM-D-412 with the results in megapascals (MPa) and percent extension (%) respectively. The tear strength, Die "B", was determined by ASTM-D-624 with the results in kilonewton per metre (kN/m). The results obtained are shown in Table I.

TABLE I

| Composition | Extrusion Rate gm/min | Durometer Shore A | Tensile Strength MPa | Elongation % | Tear Strength kN/m |
|---|---|---|---|---|---|
| A | — | 16 | 0.69 | 1600 | 2.6 |
| B | 400 | 18 | 0.59 | 1050 | 2.6 |

Composition A flowed under its own weight when placed on a horizontal surface. Composition A, using methylvinyldi(epsilon-caprolactamo)silane, was unexpectedly lower in viscosity than the comparison composition B.

EXAMPLE 2

A composition was prepared by mixing 100 parts by weight of the polydimethylsiloxane of Example 1, 110 parts by weight of the calcium carbonate filler of Example 1, and 2 parts by weight of a fume silica filler having approximately 200 m²/g surface area that had been treated with hexamethyldisilazane. After mixing together, these ingredients were milled on a standard 3 roll mill to insure extensive mixing, then placed in a container which could be sealed to exclude the moisture in the atmosphere. Then 7 parts by weight of methylvinyldi-(epsilon-caprolactamo)silane was added to the mixture under conditions excluding moisture and the mixture was thoroughly mixed. Approximately 83 parts by weight of the mixture was placed in a storage tube under conditions which excluded moisture from the composition. This composition would not cure on exposure to moisture.

Approximately 0.9 parts by weight of the aminoxy functional compound described above was added to the remainder of the mixture and thoroughly mixed, again under conditions excluding moisture. This portion was then placed in a storage tube under conditions which excluded moisture from contacting the composition.

Both of these compositions, when extruded onto a horizontal surface flowed under the force of gravity, even though they contained fume silica filler which normally causes thickening in a hydroxy endblocked polydimethylsiloxane.

That which is claimed is:

1. A composition consisting essentially of the product obtained by mixing
   (A) 100 parts by weight of a hydroxyl endblocked polydiorganosiloxane having a viscosity at 25° C. of from 0.07 to 15 Pa·s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals,
   (B) 0 to 150 parts by weight of a nonacidic, nonreinforcing filler,
   (C) 2 to 20 parts by weight of methylvinyldi-(epsilon-caprolactamo)silane,
   (D) 0.25 to 7 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR"$_2$ and a heterocyclic amine, R" is a monovalent hydrocarbon radical, the —OX group being bonded to silicon atoms through an Si—O bond, the remaining valences of the silicon atoms in the aminoxysilicon compound being satisfied by divalent oxygen atoms which link the silicon atoms of the aminoxysilicon compound having two or more silicon atoms per molecule through silicon-oxygen-silicon bonds and by monovalent radicals selected from the group consisting of monovalent hydrocarbon radicals and halogenated monovalent hydrocarbon radicals bonded to the silicon atoms through silicon-carbon bonds and there being an average of at least one monovalent hydrocarbon radical or halogenated hydrocarbon radical per silicon atom, said aminoxysilicon compound being present in an amount which is not greater than the weight of silane (C), to yield a composition which flows under the force of gravity.

2. The composition in accordance with claim 1 in which the polydiorganosiloxane is a polydimethylsiloxane and each R" is ethyl.

3. The composition in accordance with claim 2 in which the nonacidic, nonreinforcing filler is present in an amount of from 10 to 125 parts by weight.

4. The composition in accordance with claim 3 in which the silane (C) is present in an amount of from 5 to 15 inclusive parts by weight.

5. The composition in accordance with claim 4 in which the nonacidic, nonreinforcing filler is calcium carbonate.

6. The composition in accordance with claim 5 in which the aminoxysilicon compound is a linear polymer having an average of 5 to 15 silicon atoms per molecule and having siloxane units selected from the group consisting of trimethylsiloxy units, dimethyl-(N,N-diethylaminoxy)siloxy units, methyl-(N,N-diethylaminoxy)siloxane units, and dimethylsiloxane units.

7. The composition in accordance with claim 5 in which the aminoxysilicon compound is a linear terpolymer having an average of 5 to 15 silicon atoms per molecule and having siloxane units of trimethylsiloxy units, methyl-(N,N-diethylaminoxy)siloxane units, and dimethylsiloxane units.

8. The composition in accordance with claim 5 in which the aminoxysilicon compound is present in an amount of from 1 to 2 parts by weight.

9. A composition which flows under the force of gravity which is storage stable under conditions which exclude moisture but curable at room temperature upon exposure to moisture to a silicone elastomer consisting essentially of
   (A) 100 parts by weight of a hydroxyl endblocked polydiorganosiloxane having a viscosity at 25° C. of from 0.07 to 15 Pa·s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals,
   (B) 0 to 150 parts by weight of a nonacidic, nonreinforcing filler,
   (C) 5 to 20 parts by weight of methylvinyldi-(epsilon-caprolactamo)silane, said silane being present in an amount sufficient to provide at least one silane molecule per hydroxyl of the polydiorganosiloxane,
   (D) 0.25 to 7 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR"$_2$ and a heterocyclic amine, R" is a monovalent hydrocarbon radical, the —OX group being bonded to silicon atoms through an Si—O bond, the remaining valences of the silicon atoms in the aminoxysilicon compound being satisfied by divalent oxygen atoms which link the silicon atoms of the aminoxysilicon compound having two or more silicon atoms per molecule through silicon-oxygen-silicon bonds and by monovalent radicals selected from the group consisting of monovalent hydrocarbon radicals and halogenated monovalent hydrocarbon radicals bonded to the silicon atoms through silicon-carbon bonds and there being an average of at least one monovalent hydrocarbon radical or halogenated hydrocarbon radical per silicon atom, said aminoxysilicon compound being present in an amount which is not greater than the weight of silane (C).

10. The composition in accordance with claim 9 in which the polydiorganosiloxane is a polydimethylsiloxane, and each R" is ethyl.

11. The composition in accordance with claim 10 in which the nonacidic, nonreinforcing filler is present in an amount of from 10 to 125 parts by weight.

12. The composition in accordance with claim 11 in which the silane (C) is present in an amount of from 5 to 15 inclusive parts by weight.

13. The composition in accordance with claim 12 in which the nonacidic, nonreinforcing filler is calcium carbonate.

14. The composition in accordance with claim 13 in which the aminoxysilicon compound is a linear polymer having an average of 5 to 15 silicon atoms per molecule and having siloxane units selected from the group consisting of trimethylsiloxy units, dimethyl-(N,N-diethylaminoxy)siloxy units, methyl-(N,N-diethylaminoxy)siloxane units, and dimethylsiloxane units.

15. The composition in accordance with claim 13 in which the aminoxysilicon compound is a linear terpolymer having an average of 5 to 15 silicon atoms per molecule and having siloxane units of trimethylsiloxy units, methyl-(N,N-diethylaminoxy)siloxane units, and dimethylsiloxane units.

16. The composition in accordance with claim 13 in which the aminoxysilicon compound is present in an amount of from 1 to 2 parts by weight.

17. The cured composition obtained by exposing the composition of claim 1 to moisture.

18. The cured composition obtained by exposing the composition of claim 9 to moisture.

* * * * *